United States Patent
Wen et al.

(10) Patent No.: US 9,367,333 B2
(45) Date of Patent: Jun. 14, 2016

(54) BOOTING A PRINTER

(75) Inventors: Xiang-Qin Wen, Shanghai (CN);
Marvin D. Nelson, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/397,575

(22) PCT Filed: Jul. 30, 2012

(86) PCT No.: PCT/CN2012/079328
§ 371 (c)(1),
(2), (4) Date: Oct. 28, 2014

(87) PCT Pub. No.: WO2014/019117
PCT Pub. Date: Feb. 6, 2014

(65) Prior Publication Data
US 2015/0124287 A1    May 7, 2015

(51) Int. Cl.
*G06F 3/12* (2006.01)
*G06F 9/44* (2006.01)
*H04N 1/00* (2006.01)

(52) U.S. Cl.
CPC .............. *G06F 9/441* (2013.01); *G06F 9/4416* (2013.01); *H04N 1/00204* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,323,393 A | * | 6/1994 | Barrett | H04L 29/06 340/4.32 |
| 5,657,448 A | * | 8/1997 | Wadsworth | H04L 29/06 709/220 |
| 6,098,158 A | * | 8/2000 | Lay | G06F 9/4401 711/161 |
| 6,369,909 B1 | * | 4/2002 | Shima | G06F 3/1206 358/1.13 |
| 6,618,162 B1 | * | 9/2003 | Wiklof | G06F 9/4415 358/1.15 |
| 6,662,267 B2 | * | 12/2003 | Stewart | G06F 9/4401 711/103 |
| 7,136,175 B2 | * | 11/2006 | Anderson | G06F 1/3203 358/1.14 |

(Continued)

FOREIGN PATENT DOCUMENTS

| | | |
|---|---|---|
| CN | 1479238 A | 3/2004 |
| CN | 101763229 A | 6/2010 |

OTHER PUBLICATIONS

Fan, R. et al., "Instant-on Printers: Keeping Up with the Pace of Life," (Web Page), Apr. 15, 2011, 3 pages, available at: http://core.spansion.com/instant-on-printers-keeping-up-with-the-pace-of-life/#,VD7aY7HnaUk.

(Continued)

*Primary Examiner* — Ted Barnes
(74) *Attorney, Agent, or Firm* — Dierker & Associates P.C.

(57) ABSTRACT

A method for booting a printer includes storing a configuration image of the printer on a network storage device. The configuration image includes an input/output (I/O) initialization sequence for at least one component of the printer and I/O flow control steps and timing. The method further includes downloading the configuration image from the network storage device to the printer and playing back the initialization sequence and flow control based on the configuration image.

15 Claims, 4 Drawing Sheets

(56) References Cited

U.S. PATENT DOCUMENTS

| | | | | |
|---|---|---|---|---|
| 7,634,648 B2* | 12/2009 | Koyama | G06F 8/60 | 713/2 |
| 8,154,742 B2* | 4/2012 | Kawakami | G06F 3/1207 | 358/1.14 |
| 8,928,904 B2* | 1/2015 | Minamizono | G06K 15/181 | 358/1.13 |
| 2001/0039612 A1* | 11/2001 | Lee | G06F 9/4406 | 713/2 |
| 2002/0118384 A1* | 8/2002 | Isshiki | G06F 3/121 | 358/1.14 |
| 2003/0158992 A1* | 8/2003 | Ajanovic | G06F 13/124 | 710/305 |
| 2003/0184794 A1* | 10/2003 | Stringham | H04L 29/06 | 358/1.15 |
| 2003/0226005 A1* | 12/2003 | Wu | G06F 9/4406 | 713/1 |
| 2003/0231326 A1* | 12/2003 | Jackson | G06F 3/122 | 358/1.11 |
| 2006/0136706 A1* | 6/2006 | Montgomery | G06F 9/4401 | 713/2 |
| 2006/0149959 A1* | 7/2006 | Rothman | G06F 9/4406 | 713/2 |
| 2006/0184781 A1* | 8/2006 | Inada | G06F 8/60 | 713/1 |
| 2006/0192987 A1* | 8/2006 | Wu | G06F 9/4406 | 358/1.13 |
| 2006/0200539 A1* | 9/2006 | Kappler | G06F 9/4416 | 709/220 |
| 2006/0294353 A1* | 12/2006 | Rothman | G06F 11/0766 | 713/1 |
| 2007/0124573 A1* | 5/2007 | Walker | G06F 9/4418 | 713/2 |
| 2007/0165265 A1* | 7/2007 | Ito | H04N 1/00204 | 358/1.15 |
| 2007/0253010 A1* | 11/2007 | Selvaraj | G06F 3/1205 | 358/1.13 |
| 2007/0300007 A1* | 12/2007 | Bulusu | G06F 12/0891 | 711/103 |
| 2008/0148037 A1* | 6/2008 | Rothman | G06F 9/4411 | 713/2 |
| 2008/0256295 A1* | 10/2008 | Lambert | G06F 9/4406 | 711/118 |
| 2009/0161143 A1* | 6/2009 | Nakamoto | G06F 11/1433 | 358/1.14 |
| 2009/0185218 A1* | 7/2009 | Azami | G06F 3/1209 | 358/1.15 |
| 2009/0249055 A1* | 10/2009 | Itoh | G06F 9/4401 | 713/2 |
| 2009/0300151 A1* | 12/2009 | Friedman | G06F 11/3664 | 709/222 |
| 2010/0067034 A1* | 3/2010 | Minamizono | G06F 3/1245 | 358/1.13 |
| 2010/0100719 A1* | 4/2010 | Chen | G06F 1/3203 | 713/2 |
| 2010/0281476 A1* | 11/2010 | Ebi | G06F 3/1203 | 717/174 |
| 2011/0213954 A1* | 9/2011 | Baik | G06F 9/4418 | 713/2 |
| 2012/0002242 A1* | 1/2012 | Shimura | G06F 17/214 | 358/3.28 |
| 2012/0005470 A1* | 1/2012 | Oyasato | G06F 9/4416 | 713/2 |
| 2013/0036300 A1* | 2/2013 | Baik | G06F 9/4401 | 713/2 |
| 2013/0042097 A1* | 2/2013 | Baik | G06F 9/4401 | 713/2 |
| 2013/0042098 A1* | 2/2013 | Baik | G06F 9/4401 | 713/2 |
| 2013/0215467 A1* | 8/2013 | Fein | G06F 3/1204 | 358/1.15 |
| 2013/0297922 A1* | 11/2013 | Friedman | G06F 8/63 | 713/2 |
| 2014/0059338 A1* | 2/2014 | Snoussi | G06F 9/4406 | 713/2 |
| 2014/0129820 A1* | 5/2014 | Lim | G06F 9/4401 | 713/2 |
| 2014/0156985 A1* | 6/2014 | Akiyoshi | G06F 9/4418 | 713/2 |

OTHER PUBLICATIONS

International Search Report & Written Opinion received in PCT Application No. PCT/CN2012/079328, Mar. 28, 2013, 6 pages.

* cited by examiner

BOOTING A PRINTER

BACKGROUND

The booting process for some printers may cause delays before the printers are ready to print. In order to save energy, printers may be switched off. When the printers are restarted, they may require booting and experience delays before the printers are ready to print.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
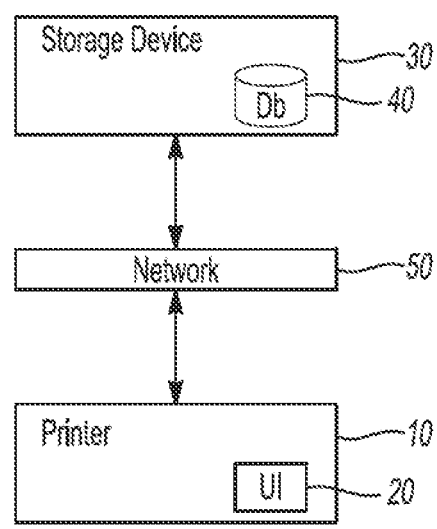
FIG. 1 is a schematic block diagram depicting an example of a printer according to the present disclosure.

Some printers may experience long boot up times. In particular, some enterprise printers may take up to several minutes to boot up. Such long boot times may cause unproductive delays for a user while consuming energy. Long boot times may increase the cost of manufacturing of some printers by increasing the time to test the printer.

A printer, as used herein, means a computer connected device which produces text or graphics of documents stored in electronic form, on physical print media including paper or transparencies. A printer as disclosed herein may be connectable to a computer network. The printer may have a network interface included therein or connected thereto, which may, for example, be wireless or Ethernet based. Furthermore, a printer may directly interface to electronic media including a memory card, or to image capture devices such as digital cameras and scanners. A printer may be combined with non-printing features (e.g., a scanner, fax machine, etc.) in a single unit, and may also function as a photocopier. A printer that includes non-printing features may also be known as a multifunction printer (MFP), multi-function device (MFD), or all-in-one (AIO) printer. An MFP may include printing, scanning, and copying, among other features.

A typical printer boot up process may include some sequential processes, the retrieving of an image from hard media, decompressing the image, operating system initialization, hardware initialization of the print engine, scanner, memory card reader, image capture device interface, automatic document feeder, an input device, an output device, a sheet feed mechanism, a collator, a display, a user interface, a hard disk drive, etc., and the user applications loading. When some printers are rebooted, they may change UI (user interface) settings and status from the UI settings and status that existed prior to the time power was shut off.

Methods have been used to reduce the boot up time of non-printer devices, e.g., personal computers and smart phones. Some methods to reduce: the time to boot up non-printer devices may include ghost systems. Such systems typically ghost (make an image of) only the storage media (e.g., the hard disk), and the operation system may re initialized itself as well as the whole hardware system in the non-printer device after boot up. Other non-printer computer systems speed up a soft boot by saving and restoring the memory without reinitializing the hardware system. In such a non-printer computer system, a cold reboot, in which the system is started after the power has been turned-off, will take longer than the soft boot because the hardware systems will require initialization.

Examples of the present disclosure provide fast and personalized boot up for a printing system. The speed of a gigabit network (or other fast media) is leveraged. In examples of the present disclosure, data may be recovered from RAM (Random Access Memory), and hardware registers. Further, the register playback history from boot up may be stored and recovered. Examples of the disclosed method may restore and boot up a printing system from a cold reset faster than conventional boot up. Further, examples of the present disclosure provide the ability to easily personalize a printer to a set of preferences. A non-transitory, tangible computer readable medium having instructions embedded thereon that, when executed, implement examples of the disclosed method for booting a printer, is also disclosed herein.

In an enterprise environment, particularly an enterprise environment that provides extensibility, examples of the present disclosure may save power, personalize user access, save time, and back up data.

FIG. 1 is a schematic block diagram depicting an example of a printer 10 connected to a network 50 according to the present disclosure. The printer 10 may include a user interface 20 (UI). Examples of the user interface 20 include a control panel having a touch screen, a display having bezel buttons, a printed panel with LED indicators and buttons, a numerical keypad, an alphanumeric keyboard, a "print" button, and a power switch, etc. The network 50 is a two way communications network. A storage device 30 is connected to the printer 10 through the network 50. The storage device 30 may be part of a server 60 (see FIG. 2). The storage device may include a database 40 or other sequencing file format for storing data.

When an example of the method of the present disclosure is used to boot up a printer, an I/O initialization sequence for each component of the printer is recorded by a daemon engine running in the background. I/O flow control steps and timing are recorded as part of the I/O initialization sequence recording. It is to be understood that the I/O initialization sequence, and I/O flow control steps and timing may be recorded and stored locally in the printer automatically and without intervention by the user. It is to be further understood that the user may intervene and selectively prevent recording of the I/O initialization sequence and flow control steps and timing. For example if an acceptable configuration image has been previously saved, the previously saved configuration image will be available, and it is not necessary to record the I/O initialization sequence that would be used to create the same configuration image again. Still further, examples of the present disclosure may automatically intervene and selectively prevent recording of the I/O initialization sequence and flow control steps and timing.

Figure 2:
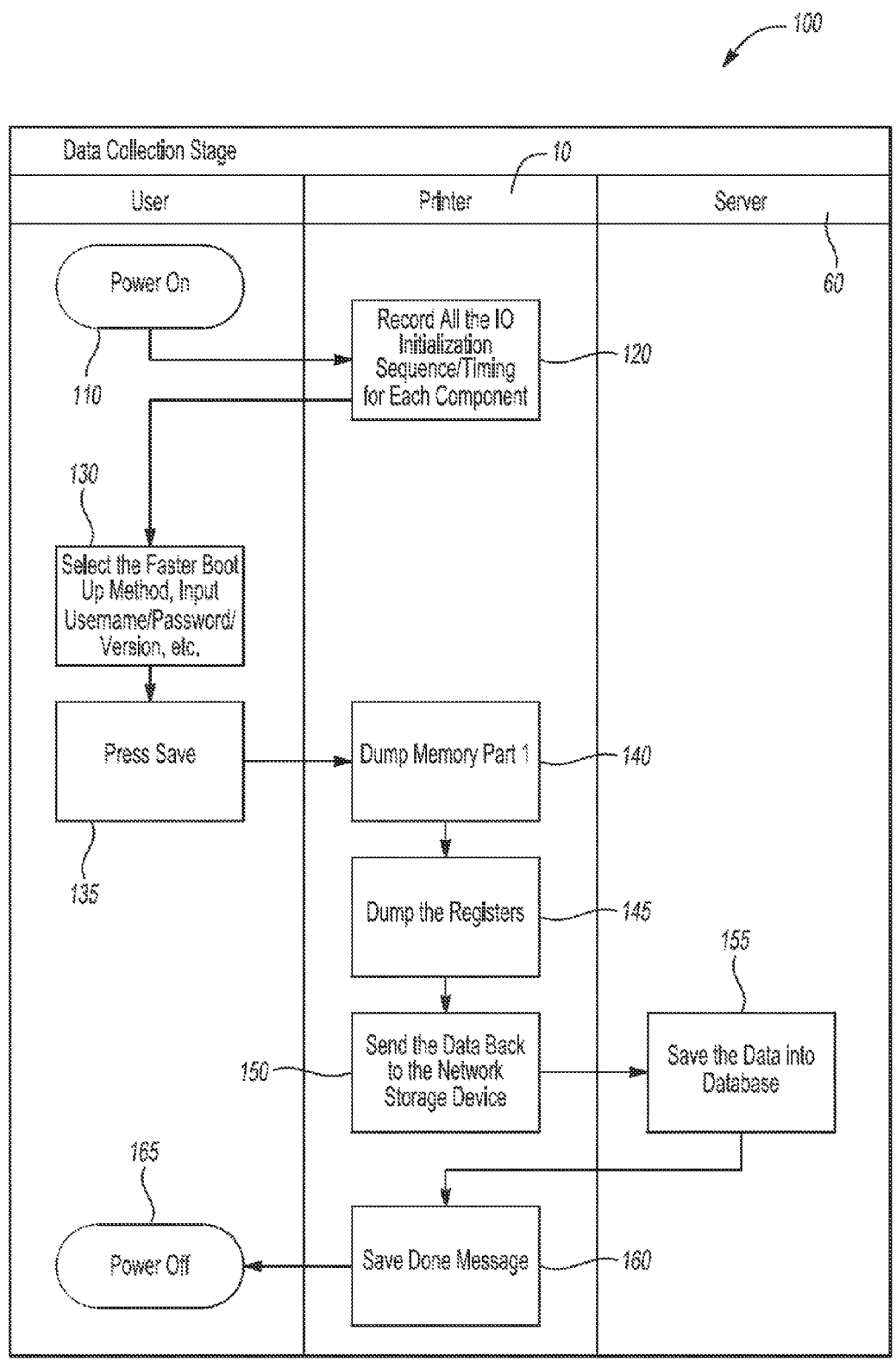
FIG. 2 is a flow chart depicting an example of a data collection portion of a booting process according to the present disclosure.
Figure 3:
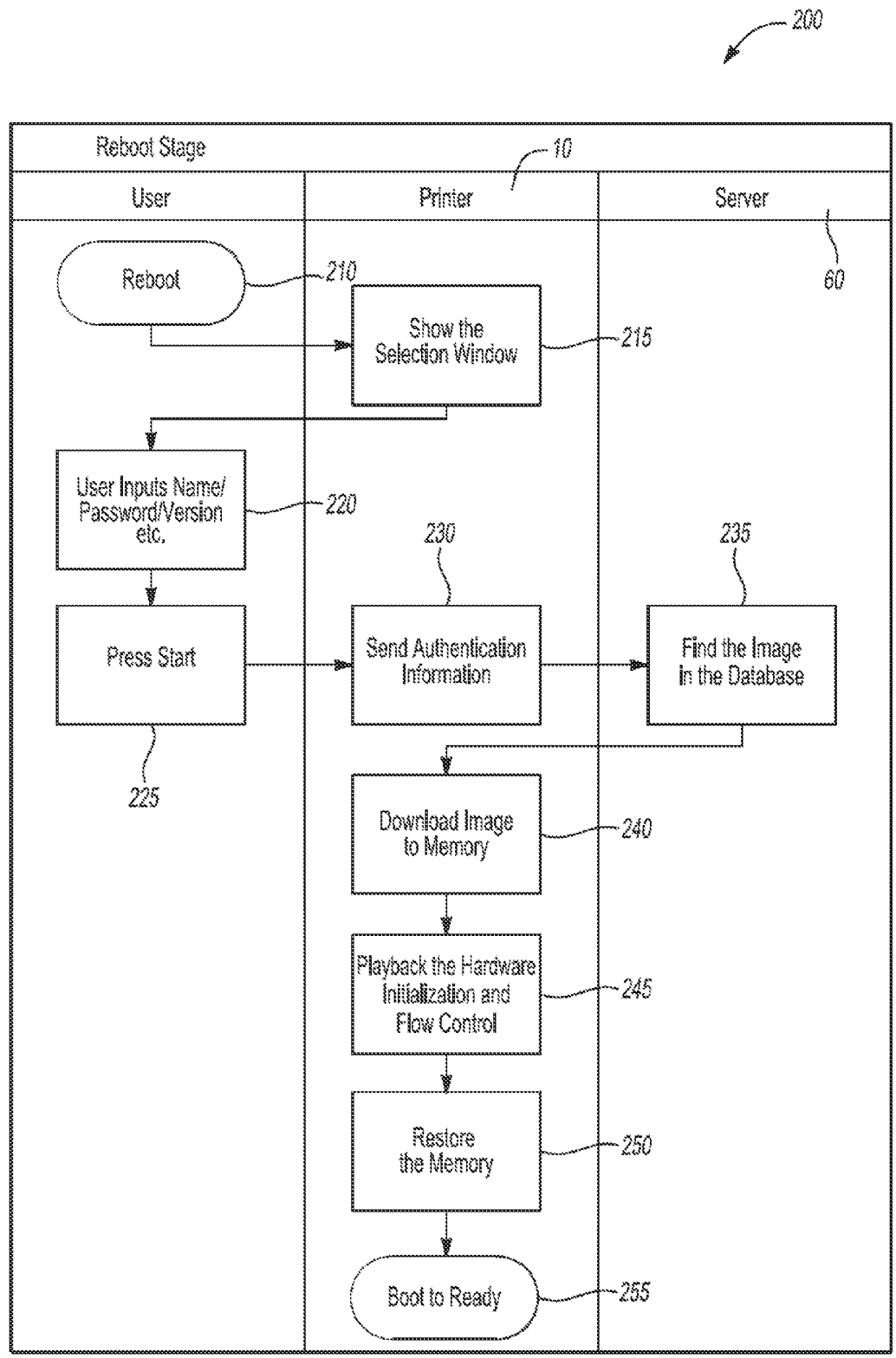
FIG. 3 is a flow chart depicting an example of a reboot portion of a booting process according to the present disclosure.

Examples of the method disclosed herein may include two stages: a data collection stage (see FIG. 2); and a reboot stage (see FIG. 3).

FIG. 2 shows an example of the data collection stage 100 of the present disclosure. In the data collection stage 100, a configuration image of the printer 10 is stored in a database 40 or other sequencing file format on a network storage device 30. The configuration image includes the input/output (I/O) initialization sequence for a component of the printer, and a copy of pertinent memory and device register states. The I/O initialization sequence includes reads, writes, flow control points and timing. The data collection stage begins with power on 110. As shown at 120, the printer 10 locally records the I/O initialization sequence/timing for each component of the printer 10.

At 130, the user selects the faster boot up method, and inputs a usename/password/version, etc. to authenticate. In the example depicted in FIG. 2, a user initiates storage of the configuration image data on the network storage device 30 by making a save request at 135, by pressing save. The save request may include the user making a selection on a UI indicating that the current state of the printer 10 is to be stored. The current state of the printer 10 is part of the configuration image of the printer 10 to be stored on the network storage device 30.

In another example, the configuration image is stored on the network storage device in response to the printer reaching a predetermined state. For example, if the printer 10 detects that UI settings have not changed for a predetermined amount of time (for example, about 5 hours) and the configuration image would be different from the configuration images already stored, then the printer may automatically initiate storage of the configuration image data on the network storage device 30 without the user making a save request.

As shown at 140, the printer 10 will dump at least a first portion of current data stored in a printer system memory and store the first portion as part of the configuration image in the network storage device 30.

The printer system memory of the present disclosure is divided into a first portion and a second portion. Memory data dumped from the first portion is included in the configuration image stored on the network storage device and will be recovered. The first portion of the printer system memory is for the standard printing system. As used herein, the standard printing system means the software and commands that are used by the printer to perform printing and communication operations that are not exclusively used by the recording daemon engine. The second portion of the printer system memory is dedicated to the recording daemon engine to keep all the I/O operations sequences and timings. Standard printing applications have no access to the second portion of memory. In the data collection stage, the first portion of the printer system memory is dumped and stored as part of the configuration image, and the second portion of the printer system memory is not directly stored as part of the configuration image. The second portion of the printer system memory is where the configuration image that will be stored in the network storage device is constructed. The second portion is also where recordings from the recording daemon engine are stored prior to formatting them to be part of the configuration image. The second portion is where the configuration image is placed during playback and restore.

As shown at 146, FIG. 2 depicts dumping register data from component and processor registers of the printer 10. Copies of selected portions of the register data that is dumped may be stored without change in the configuration image in the network storage device. Selected portions of the register playback history of devices may be stored in the network storage device as part of the configuration image. The register playback history may include a sequence of register reads and writes, timing elements and flow control data requirements.

In the second portion of the printer system memory, the printer 10 assembles all of the data for storage into the configuration image file before it is transmitted to the network storage devise 30. A format of the configuration image that is transmitted between the printer 10 and the network storage device 30 is as follows:

Header (User Name + Version + Printer ID + length)
CPU Entry Point Address
Memory Dump (Normal print part)
Register Dump (Non_Sequenced Register initialization)
Sequence of register read/write/timing element/flow control data As depicted at 150, the data is transferred from the printer 10 to the let work storage device 30 via a reliable network communications protocol. In an example, the reliable network communications protocol may be TCP (Transmission Control Protocol). In other examples, SMTP (Simple Mail Transfer Protocol), FTP (File Transfer Protocol) or any file based delivery protocol may be used to communicate between the printer and the network storage device.

In an example, a server 60 may include the network database or other sequencing file format for storing the configuration image for later retrieval during printer boot up. As depicted at 155, the network storage device 30 may include a server 60, and the server 60 may save the data into a database 40. In some cases, the server 60 may authenticate or authorize a user 15 to grant access to the image for storage and retrieval. At 160, the server 60 may send a message to the printer 10 to confirm when the configuration image save operation is complete. After the configuration image has been successfully stored, the printer 10 may be powered off as shown at 165. It is to be understood that the power off 165 may occur automatically after receiving the save confirmation message 160, or the user 15 may manually determine when power is to be turned off. In an example, a user 15 may determine that the printer is in a state that may be useful at boot up and indicate that the configuration image should be saved without necessarily wanting to power off at that particular time.

It is to be understood that the network database or other sequencing file format may be stored on any computer readable media having read/write speeds of at least 125 MB/s (Megabytes per second) connected to the printer via a network cable, fiber, or a wireless connection. The network cable, fiber or wireless connection may be, for example, a Local Area Network (LAN) cable with Gigabit speed.

The reboot stage 200 shown in FIG. 3 may be entered by, for example, manipulating a power switch to supply electrical power to the printer 10. The printer 10 may include a bootloader that initializes a display (allowing the display to show a selection window (box 215)) and network communications sufficiently for the printer 10 to authenticate a user 15 and provide enough of a display for the user 15 to select a configuration image (e.g., user 15 inputs name/password/version, etc. (box 220)) and press "start" 225. The bootloader is stored in a non-volatile memory of the printer 10. As depicted at 230, the printer 10 sends the authentication and configuration selection information through the network 50 to the server 60. At 235, the server 60 finds the selected configuration image in the network storage device 30 (e.g. in the network database 40).

As disclosed above, after the printing system begins to reboot 210, the user 15 may use a user interface 20 to input authentication data and select a configuration image from a plurality of configuration images stored on the network database 40. The plurality of configuration images stored on the network database 40 may include a standard configuration image and a customized configuration image. Alternatively, in an example, the printer 10 may retrieve a default configuration image from the network database 40. For example, the user 15 may be presented with a choice of images on a control panel. In the example, a default configuration image may be highlighted or preselected so that the user 15 only has to accept the default by, for example, touching an "Enter" key. If the user 15 chooses to select another configuration image, for example, a configuration image that includes the user's personal preference settings, the user 15 may touch an icon corresponding to that configuration image on a touch screen. If the user 15 does not make a selection in a predetermined amount of time, the printer system may automatically select the default configuration image.

As shown in FIG. 3, after the configuration image is selected, the configuration image is downloaded 240 from the network storage device 30 to the printer system memory. The downloaded configuration image may range in size from about 10 megabits to about 500 megabits. In examples in which the network is at least a gigabit network, the time to transmit the data in the configuration image is insignificant compared to the time to perform other steps in the boot up operation. The printer bootloader will first call the I/O playback engine and, as depicted at 245, use the second part of the memory to playback the hardware timing sequence (initialization), do flow control, and set the registers to the state stored in the configuration image. See FIG. 4 for a playback data flow diagram.

It is to be understood that examples of the present disclosure may cause component initialization to begin before an operating system initialization is complete. Further, the component initialization may be caused to proceed in parallel via hyperthreading. After the component initialization is done, the printer CPU returns to the bootloader calling the bootloader address saved in the stack. At 250, the bootloader restores the memory dump from the selected configuration image to the local memory of the printer. As depicted at 255, the printer 10 is now "ready"—boot up is complete.

Figure 4:
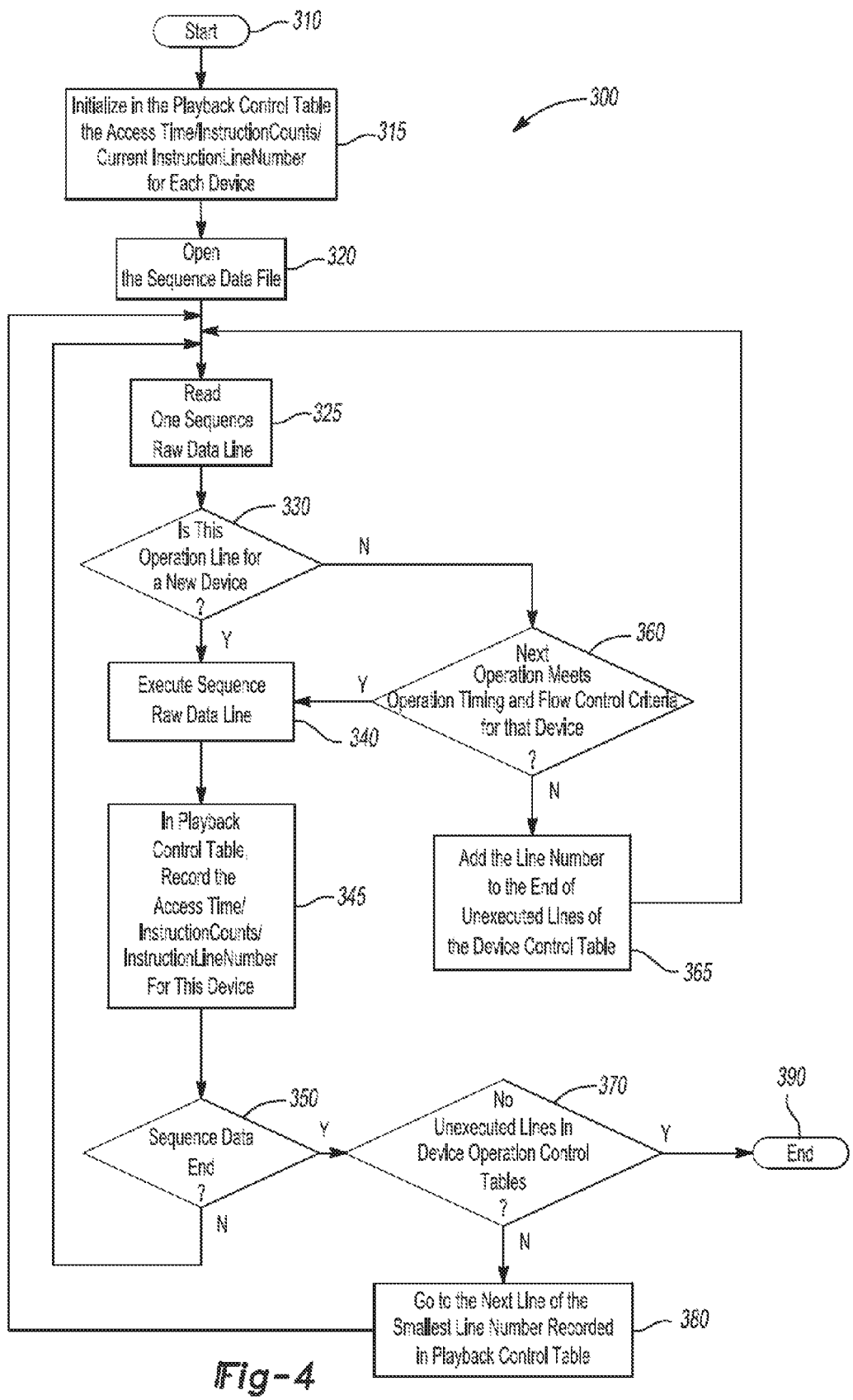
FIG. 4 is an example of a playback data flow diagram according to the present disclosure.

FIG. 4 is a data flow diagram depicting a playback engine 300. The playback engine 300 starts at 310 and proceeds to 315 to initialize in the playback control table the access time/instructionCounts/current instructionLineNumber for each device followed by opening the sequence data file at 320. At 325, the playback engine will read one sequence raw data line. At 330, there is a test: "Is this operation line for a new device?" If the answer to the test at 330 is "yes", then the playback engine follows the flowchart branch leading to 340; otherwise, the branch to 360 is followed. At 340, the playback engine 300 will execute a sequence raw data line. At 345, the playback engine 300 will record the access time/instructionCounts/instructionLineNumber for this device in the playback control table. At 350 is test block: "Sequence data end?" If the answer is yes, then the playback engine follows the flowchart branch leading to 370; otherwise, the playback engine returns to block 325. At 360 is test block: "Does the next operation meet operation timing and flow control criteria for that device?" If the answer is yes, then the playback engine follows the flowchart branch leading to 340; otherwise, the playback engine follows the branch leading to block 365. At 365 the playback engine 300 adds the line number to the end of unexecuted lines of the device control table, then returns to block 325. At 370 is test block: "No unexecuted lines in device operation control table?" If the answer is yes, then the playback engine follows the flowchart branch leading to 390-end; of the playback engine follows the branch leading to block 380. At 380, the playback engine goes to the next line of the smallest line number recorded in the playback control table and returns to block 325.

Examples of the present disclosure may include exception handling in the printer boot up process. For example, the printer may revert to a conventional boot if the printer 10 is not capable of attaining a state corresponding to the configuration image.

To further illustrate the present disclosure, examples are given herein. It is to be understood that these examples are provided for illustrative purposes and are not to be construed as limiting the scope of the present disclosure.

EXAMPLES

Table 1 is a semi-empirical estimate of the difference in boot up time after applying examples of the present disclosure to a typical small to medium business (SMB) printer that produces full color on one side of a sheet and one color on the other side of the sheet (4:1) with no hard disk drive (HDD) in the printer.

Table 2 is a semi-empirical estimate of the difference in boot up time after applying examples of the present disclosure to a typical enterprise printer that produces full color on one side of a sheet and one color on the other side of the sheet (4:1) with a hard disk drive (HDD) in the printer.

TABLE 1

|  | typical SMB printer (4:1, w/o HDD) seconds | After Suggested Solution seconds | Saving seconds |
|---|---|---|---|
| Bootloader |  |  |  |
| Decompress image | 4 | 0 | 4 |
| Hardware Initialization (display/networking/HDD etc.) | 2 | 2 | 0 |
| Others boot software | 1 | 2 | −1 |
| Main |  |  |  |
| Core OS boot | 2 | 0 | 2 |
| Hardware Initialization (display/networking/USB/WiFi etc.) | 5 | 1 | 4 |
| Engine/ADF/Flatbed/FAX hardware initialization (parallel) | 15 | 15 | 0 |
| Print/Scan/Copy/FAX/networking Applications | 27 | 2 | 25 |
| Total | 56 | 22 | 34 |

TABLE 2

|  | typical enterprise printer (4:1, with HDD) Seconds | After Suggested Solution Seconds | Saving Seconds |
|---|---|---|---|
| Bootloader |  |  |  |
| Decompress image | 8 | 0 | 8 |
| Hardware Initialization (display/networking/HDD etc.) | 2 | 2 | 0 |
| Others boot software | 2 | 5 | −3 |

TABLE 2-continued

| | typical enterprise printer (4:1, with HDD) Seconds | After Suggested Solution Seconds | Saving Seconds |
|---|---|---|---|
| Main | | | |
| Core OS boot | 10 | 0 | 10 |
| Hardware Initialization (display/networking/HDD/USB/WiFi etc.) | 10 | 3-8 | 2-7 |
| Engine/ADF/Flatbed/FAX hardware initialization (parallel) | 30 | 30 | 0 |
| Print/Scan/Copy/FAX/networking Applications | 110 | 4 | 106 |
| Total | 172 | 44-49 | 123-128 |

It is to be understood that the ranges provided herein include the stated range and any value or sub-range within the stated range. For example, a size ranging from about 10 megabits to about 500 megabits should be interpreted to include not only the explicitly recited limits of 10 megabits to 500 megabits, but also to include individual amounts, such as 150 megabits, 200 megabits, etc., and sub-ranges, such as from about 125 megabits to about 350 megabits, etc. Furthermore, when "about" is utilized to describe a value, this is meant to encompass minor variations (±10 percent from the stated value (e.g., ±10% from the stated size)).

While several examples have been described in detail, it will be apparent to those skilled in the art that the disclosed examples may be modified. Therefore, the foregoing description is to be considered non-limiting,

What is claimed is:

1. A method for booting a printer, the method comprising:
storing a current configuration image of the printer on a network storage device, the current configuration image indicating a current state of the printer and including an input/output (I/O) initialization sequence for at least one component of the printer, and I/O flow control steps and timing;
during a reboot of the printer:
presenting on a user interface of the printer, a plurality of configuration images including the current configuration image, each of the plurality of configuration images indicating a different state of the printer and including an I/O initialization sequence and I/O flow control steps and timing;
receiving via the user interface, a user-selected configuration image from the plurality of configuration images;
downloading the user-selected configuration image from the network storage device to the printer; and
playing back the I/O initialization sequence and the I/O flow control steps and timing of the user-selected configuration image to restore the state of the printer indicated by the user-selected configuration image.

2. The method as defined in claim 1, further comprising:
causing an I/O initialization sequence to be recorded for each of the at least one component of the printer during the reboot; and
causing I/O flow control steps and timing to be recorded.

3. The method as defined in claim 1 wherein each configuration image includes:
a memory data stored in a first portion of memory of the printer; and
a register data stored in processor registers of the printer.

4. The method as defined in claim 1 wherein a configuration image is stored on the network storage device in response to a save request entered on the user interface of the printer.

5. The method as defined in claim 1 wherein each configuration image is stored in a database or other sequencing file format on the network storage device.

6. The method as defined in claim 1 wherein the plurality of configuration images includes a standard configuration image and a customized configuration image.

7. The method as defined in claim, 1 further comprising:
identifying and authenticating a user via the user interface of the printer; and
authenticating the user as a condition for allowing the printer access to the user-selected configuration image stored on the network storage device.

8. The method as defined in claim 1, further comprising:
causing component initialization to begin before an operating system initialization is complete; and
causing the component initialization to proceed in parallel via hyperthreading.

9. The method as defined in claim 1, further comprising causing the printer to revert to a conventional bootup if the printer is not capable of attaining a state corresponding to a configuration image.

10. The method as defined in claim 1 wherein the at least one component of the printer is chosen from a scanner, a print engine, an input device, an output device, a memory card reader, an image capture device interface, an automatic document feeder, a sheet feed mechanism, a collator, a display, a user interface, a hard disk drive, and combinations thereof.

11. The method as defined in claim 1, wherein the current state of the printer is selected from the group consisting of a previous state stored as a result of a user save request, and a predetermined state stored as a result of the printer reaching the predetermined state.

12. A non-transitory, tangible computer readable medium having instructions embedded thereon that, when executed, implement a method for booting a printer, the instructions to:
cause an input/output (I/O) initialization sequence to be recorded for at least one component of the printer during a bootup;
cause I/O flow control steps and timing to be recorded;
store a configuration image of the printer on a network storage device, the configuration image indicating a state of the printer and including the I/O initialization sequence for each of the at least one component of the printer and the I/O flow control steps and timing;
during the bootup:
present on a user interface of the printer, a plurality of configuration images including the configuration image, each of the plurality of configuration images indicating a different state of the printer and including an I/O initialization sequence and I/O flow control steps and timing;
receive via the user interface, a user-selected configuration image from the plurality of configuration images;
download the user-selected configuration image from the network storage device to the printer; and
play back the I/O initialization sequence and the I/O flow control steps and timing of the user-selected configuration image to restore the state of the printer indicated by the user-selected configuration image.

13. The non-transitory, tangible computer readable medium as defined in claim 12 wherein the configuration image is stored in a database or other sequencing file format on the network storage device;

and wherein the configuration image is stored on the network storage device in response to the printer reaching a predetermined state.

14. The non-transitory, tangible computer readable medium as defined in claim 12 wherein the configuration image is chosen via a user interface from a plurality of configuration images, the plurality of configuration images including a standard configuration image and a customized configuration image;
and wherein the at least one component of the printer is chosen from a scanner, a print engine, an input device, an output device, a memory card reader, an image capture device interface, an automatic document feeder, a sheet feed mechanism, a collator, a display, a user interface, a hard disk drive and combinations thereof.

15. The non-transitory, tangible computer readable medium as defined in claim 12, the instructions further to:
cause hardware initialization to begin before an operating system initialization is complete;
cause the hardware initialization to proceed in parallel via hyperthreading; and
cause the printer to revert to a conventional boot if the printer is not capable of attaining a state corresponding to the configuration image.

* * * * *